United States Patent [19]

Hedvall et al.

[11] Patent Number: 4,923,776
[45] Date of Patent: May 8, 1990

[54] TONER PARTICLES FOR ELECTROPHOTOGRAPHIC COPYING AND PROCESSES FOR THEIR PREPARATION

[75] Inventors: Bertil Hedvall, Sundsvall; Gunnar Mattson, Njurunda; Sten Porrvik; Göran Sundström, both of Sundsvall, all of Sweden

[73] Assignee: Casco Nobel AB, Stockholm, Sweden

[21] Appl. No.: 265,140

[22] PCT Filed: Mar. 18, 1987

[86] PCT No.: PCT/SE87/00139

§ 371 Date: Oct. 26, 1988

§ 102(e) Date: Oct. 26, 1988

[87] PCT Pub. No.: WO88/07225

PCT Pub. Date: Sep. 22, 1988

[51] Int. Cl.$^5$ .................. G03G 9/00; G03G 13/06
[52] U.S. Cl. ..................................... 430/111; 430/137
[58] Field of Search ............................... 430/111, 137

[56] References Cited

U.S. PATENT DOCUMENTS 4,254,203 11/1979 Oka et al. .
4,254,204 3/1981 Kato et al. .
4,614,698 7/1983 Miyakawa et al. .
4,670,368 6/1983 Tosaka et al. .
4,794,065 12/1988 Hedvall et al. ..................... 430/111

FOREIGN PATENT DOCUMENTS 2131565 11/1977 United Kingdom .
2112538 12/1981 United Kingdom .
87/01828 2/1967 World Int. Prop. O. .
84/04975 8/1969 World Int. Prop. O. .

OTHER PUBLICATIONS

Patent Abstract of Japan, vol. 7, No. 60, P-182, Abstract of JP 57-207259, publ. 1982-12-18.

Primary Examiner—John L. Goodrow
Attorney, Agent, or Firm—Fred Philpitt

[57] ABSTRACT

Toner particles for electrophotographic copying and electrostatic printing consist of pigmented thermoplastic base particles having the surface covered with a thermoplastic fine-grained polymerizate. The base particles are prepared by suspension polymerization and the fine-grained polymerizate originates from a latex prepared by emulsion or microsuspension polymerization. One method of preparing the toner consists of bringing an aqueous dispersion of the base particles into contact with a latex of the fine-grained polymerizate. The temperature is raised so that the fine-grained particles adhere to the surface of the base particles. A protective colloid system can be present and the particles can have charges of opposite character. In another method the preparation of the toner particles comprises suspension polymerization of monomer for formation of the base particles in the presence of an already prepared latex whereby the latex particles have higher hydrophilicity than the polymer in the base particle. The fine-grained particles can also be applied to the base particles according to a dry method.

17 Claims, No Drawings

TONER PARTICLES FOR ELECTROPHOTOGRAPHIC COPYING AND PROCESSES FOR THEIR PREPARATION

The present invention relates to toner particles for use in electrophotograhic copying or electrostatic printing. More particularly the invention relates to such toner particles having a pimply surface. The invention also relates to methods for the preparation of such toner particles.

In electrophotographic copying the latent print on the photo-drum is developed with a toner consisting of fine-grained pigmented thermoplastic particles. The most common method of preparing a toner comprises melting a thermoplastic material and mixing this with pigment, charge modifiers, release agents etc. The product is then cooled, crushed, ground and screened in an air stream to obtain particles with a size in the order of from 5 to 30 $\mu$m. According to this method particles of very varying shapes and sizes are obtained. This variation in shape and size gives rise to certain disadvantages in the copying process. Efforts have thus been made to find processes which give toner materials having spherical and fairly uniformly sized particles.

One way of preparing a toner is to finely divide molten waxes or low molecular thermoplastic materials in a spray drier. If such conditions are used at the spray drying that a suitable particle size is obtained directly the grinding step can hereby be eliminated. A disadvantage of the spray drying is, however that the size distribution of the powder is fairly wide. Further, it is not possible to satisfactorily spray dry a melt of the thermoplastic materials which are usually used at so-called heat fixing by means of hot rolls or radiation. Spray dried powders are more suitable as toners intended for cold fixing by means of pressing. Spray dried particles are advantageous in that they are spherical and thus not of such varying shapes as ground particles.

One method of preparing toner particles suitable for hot fixing, which method in principle is very cheap, is to disperse pigments, charge modifiers, release agents, initiators etc in monomers which give polymers having suitable properties for heat fixing. The monomer is emulsified with a suitable colloid system in water, the temperature is raised and by polymerization a fine, pigmented powder of sperical particles is directly obtained and this powder can be dried, after washing, to give a powder suitable for use in coping. Since the method is very simple several attempts have been made to prepare toner particles in this way. One process of this kind is disclosed in the British patent application 2091435. In practical tests it has been found that particles prepared by suspension polymerization have certain advantages such as the capability of giving copies with good resolution. However, it has also been found that such particles have a serious disadvantage in that they have such a strong adhesion to the photo-drum that they are only very incompletely transferred to the paper. Such particles also agglomerate strongly with each other which means that such a toner has very poor free-flowing properties etc.

The drawbacks with the particles mentioned above can be related to the smooth surface of the spherical particles prepared by normal suspension polymerization. When spherical particles with a smooth surface are used the adhesion to the photo-drum will be so strong that they are not even completely removed at the cleaning of the photo-drum which follows the transfer step. Such remaining toner thus leads to a rapid deterioration of the quality of the copies. A strong adhesion to the photo-drum is particularly serious if the toner consists of or contains very fine particles, <5 $\mu$m, since it is more difficult to remove such fine particles from the surface of the photo-drum by means of mechanical cleaning systems.

According to the present invention it has been found that spherical particles having a pimply surface do not show the disadvantage of a strong adhesion to the photo-drum. In several cases such particles even have lower adhesion than toner particles prepared by the conventional grinding process.

The present invention thus relates to a toner which comprises an internally pigmented base particle, or main particle, prepared by suspension polymerization and having a mean diameter of from 2 to 25 $\mu$m, the surface of the particle being covered by a fine-grained polymerizate with a mean diameter of from 0.05 to 33% of the mean diameter of the base or main particle.

Internally pigmented base particles here refer to particles prepared in a manner where the pigment is mixed with the monomer before the polymerization and thus is present more or less uniformly distributed in the finished polymerized base particle.

The application of the fine-grained particles on the surface of the toner particles can be carried out in a manner which is technically so simple that the whole process from monomers to coated toner particles is economically advantageous. The invention therefore represents a more economical way to make high quality toners.

The size of the fine-grained particles which form protuberances on the surface of the base or main particles should be substantially smaller than these particles. The diameter of the fine-grained particles should thus be maximum 33%, and preferably maximum 15%, of the diameter of the base particle. The lower size limit is set by the smallest size which gives the desired effect of reduced adhesion to the photo-drum. Already pimples having a size in the order of 0.005 $\mu$m give a reduced adhesion. The fine-grained polymerizate suitably has a particle size in the range of from 0.005 to 5 $\mu$m, preferably from 0.02 to 2 $\mu$m.

Another important factor is the degree of covering, ie how great a part of the surface of the particle which is covered by fine-grained particles. The closest possible covering corresponds to about 91% of the surface of the base or main particle. However, such a high degree of covering is not necessary to reduce the adhesion to the photo-drum. It has surprisingly been found that already a degree of covering of from 1 up to 10% gives a very strong reduction of the adhesion.

Toner particles according to the invention with fine particles forming protuberances on the surface of the base or main particles can be prepared in a number of different ways as described below.

First will be described a process according to which fine-grained particles are adhered to the surface of base particles already prepared by suspension polymerization. To make the base particles monomer soluble initiator, pigment and optional charge modifier and a dispersing agent for the pigment are first mixed. The mixture is emulsified in water using a suitable colloid system. After evacuation the temperature is raised for polymerization and spherical base particles are obtained. The mean diameter of these can be from 2 to 25 μm, preferably from 3 to 15 μm.

The small polymer particles which are applied to the surface of the base particles can be prepared by emulsion polymerization or microsuspension polymerization in per se known manners and, if desired, charge modifiers and pigments can for example be incorporated at microsuspension polymerization.

It is desirable that the fine-grained particles are strongly anchored in the surface of the base particles. This can be achieved by softening the base particles using small amounts of softening agents or by heating. Hereby the fine-grained particles will be anchored by melting into the surface. It is suitable that the fine-grained particles melt into the base particles to a depth corresponding to about half the diameter of the fine-grained particle. However the depth can be varried, it is only nessecary that the fine-grained particles are firmly anchored in the base particles and at the same time protrude out from the surface of them.

The polymer composition of the fine-grained particles may be the same as that of the base particle. However, it might be advantageous to choose a more high-melting polymer type for the fine-grained particles on the surface. A higher melting point gives a smaller risk that the fine-grained particles will agglomerate with each other instead of adhering to the surface of the base particles at the coating process. In order to make the fine-grained particles on the surface particularly difficult to melt they can be cross-linked to a higher degree than the base particles.

The fine-grained particles can be applied to the surface of already formed base particles in wet or dry methods or according to a special technique, described below, to the surface of the monomer droplets, which after polymerization together with the latex particles will form pimply particles.

A toner can for example be prepared by bringing an aqueous dispersion of the pigmented base particle into contact with a latex of the fine-grained polymerizate whereby a protective colloid system is subsequently formed in the aqueous dispersion and the temperature raised to make the fine-grained particles adhere to the surface of the base particles.

At production according to this method the protective colloid system which has been used for the suspension polymerization of the base particles is suitably first deactivated. If, for example, certain inorganic powder stabilisers have been used as protective colloids such as difficultly soluble phosphates these can be dissolved by acidifying the aqueous suspension of the base particles. The latex of the fine-grained particles is then slowly added. Hereby such conditions should be used that the latex will not precipitate immediately on contact with the suspension of the base particles, since there is then a risk that the small particles in the latex will agglomerate with each other instead of being deposited on the surface of the base particles.

After agitation for some time the fine-grained particles will have been precipitated on the surface of the base particles. The system is then made more alkaline so that the protective colloid system will be reformed. There is then no risk of agglomeration of the particles when the dispersion is warmed to melt the fine-grained particles into the surface of the base particles. Acidification and washing is then carried out.

In some cases the protective colloid system can be kept intact when the latex of the fine-grained particles is added. In this case latex particles and base particles which have opposite charges are used. This is achieved through controlling the Zeta-potential of the particles. The chemical composition of the surfaces of the base particles and the latex particles are chosen in such a way that the two types of particles have Zeta-potentials of opposite character at the used condition. This can be accomplished by copolymerization with functional monomers with charges of opposite character. The charged latex particles will be attracted to the base particles of opposite charge and thereby penetrate the colloid layer.

To give the toner the correct triboelectric charge the fine-grained particles on the surface must have a specific triboelectric charge and this can be achieved by subsequently precipitating a charge modifying agent on the surface of the coated particles. If the fine-grained particles are prepared by microsuspension polymerization a charge modifying agent can alternatively be mixed with the monomer already before the polymerization of the fine-grained particles. Finally the chemical composition of the fine-grained particles can be selected in such a manner that no extra addition of charge modifying agent is required. Examples of such particles which give a positive triboelectric charge are fine-grained particles of polyacrylonitrile or amino-containing monomer. When fine-grained particles of polyvinyl chloride, fluoro polymers etc are used a negative triboelectric charge is obtained.

The fine-grained particles can also be applied according to a dry method. At application of the fine-grained particles by a dry method the base particles are first dried and charged to a mixer. To keep a uniform mixture in the powder bed it is advantageous to admix larger beads, eg glass beads of 5 mm. The small polymer particles which are to cover the surface are then charged to the powder bed. The small particles can be present either as a dispersion in a suitable liquid, whereby the liquid is evaporated from the powder bed, or as an already dried very fine-grained powder. The temperature of the powder bed is raised under continued agitation. The small particles will then adhere to the surface of the base particles and, at higher temperatures, at least partly melt into the surface of the base particle.

An alternative way of making the small polymer particles melt into the surface of the base particles is to introduce the coated base particles into an air stream which for a short time is heated to a temperature of from 150° to 400° C., depending on the dwell time in the hot zone.

According to the above described methods the base particles are first prepared by suspension polymerization and these are then treated with a latex of the fine-grained polymerizate to give "pimply" toner particles according to the invention.

According to another method for the preparation of toner particles with a rough surface a special kind of process is used and herein a latex, ie the fine-grained polymerizate, is first prepared and the base particles, are prepared by suspension polymerization in the presence of the already prepared latex. In the following this method of preparation, which forms part of the present invention, will be described more in detail.

According to the last method spherical particles with a pimply surface, useful as toners in electrophotographic copying and electrostatic printing, are produced by first preparing a latex, an aqueous dispersion, of fine-grained polymer particles. The latex can be prepared according to the emulsion polymerization technique using water soluble initiators and suitable emulsifiers or according to the technique of microsuspension polymerization whereby the monomer is first finely divided in water, by means of intensive emulsifying and using surfactants, and then polymerized using initiators which usually are soluble in the monomer. In certain cases water soluble initiators can, however, be used in microsuspension polymerization.

The latex particles shall be insoluble in the monomers and optionally other solvents and for this purpose they are preferably cross-linked. Further, the surface of the latex particles shall have a fixed hydrophilic/hydrophobic character.

At the production of pimply particles according to the method latex is mixed with a monomer or a monomer mixture. Monomer soluble initiator, pigment, charge modifying agent, release agent etc can have been added to the monomer in advance. The mixing conditions, with regard to pH etc, should be selected in such a manner that the latex particles leave the aqueous phase and migrate to the monomer phase or to the monomer-water-phase boundary. Additional water and a suitable colloid system is then charged. The monomer is emulsified to small drops and the temperature is raised for polymerization. After polymerization a fine-grained pigmented powder is obtained. At investigation with a scanning electron microscope it is found that the latex particles of suitable hydrophilic/hydrophobic balance have migrated to the surface of the polymer particles formed at the suspension polymerization. Hereby a pimply surface is obtained on these particles.

By varying the hydrophilic/hydrophobic balance it is possible to control the displacing of the latex particles with regard to the surface of the formed base particles. If the latex particles have a very hydrophobic character, for example if they have been prepared from pure styrene, divinyl benzene and with hydrogen peroxide as initiator, they will not at all penetrate the surface of the formed polymer particles. Such latex particles can thus not be seen by studying the formed polymer particles in a scanning microscope. On the other hand, if the latex particles are too hydrophilic they can after the polymerization be found in the aqueous phase.

Suitable hydrophilicity for the latex particles depend on the hydrophilicity of the main particles. The latex particles should have a higher hydrophilicity than the polymer of the main particles. The upper limit for the hydrophilicity of the latex particles is the level where the latex particles start being pressed out from the main particles to the aqueous phase during the polymerization.

The degree of hydrophilicity can for example be controlled at the preparation of the latex particles by adding certain amounts of monomer with anionic character in alkaline environment, for example methacrylic acid, itaconic acid, styrene sulphonic acid, etc. Compounds with cationic character in acid environment can also be incorporated in the latex polymer to make the latex particles more hydrophilic, eg trimethylammoniumethyl methacrylate halide. However, it is not necessary to use ionised groups to achieve hydrophilicity. Control of hydrophilicity can also be achieved by polar, non-ionised monomers, eg methyl methacrylate, acrylo nitrile, allyl alcohol, 2-dimethylaminoethyl methacrylate, hydroxyethyl methacrylate. As polar nonionised monomers such containing amino groups or hydroxyl groups are preferred. It is also possible to use ampho teric latex which contains both acid and basic groups for obtaining a suitable hydrophilicity. The determining factors for the latex particles to form pimples according to this method are thus that the latex particles are not soluble in the monomer or the monomers which form the main particle and that the surface of the latex particles have a more hydrophilic character than the polymer of the formed main particle.

Cross-linking is of course not necessary if the polymer composition of the latex particles is such that the latex particles are not soluble in the monomers without being cross-linked. An example of this is latex particles of polyacrylonitrile, or of copolymerizates having a high acrylonitrile content. Otherwise the latex particles are cross-linked to obtain insolubility.

The degree of cross-linking in the latex particles is of certain importance. At a low degree of crosslinking the latex particles will swell in the monomers. The size of the pimples in the finished particles will then be greater than the size of the particles in the used latex. Hereby a certain amount of latex will suffice to cover a greater part of the surface of the main particles. The swelling of the latex particles also results in that the difference in hydrophilicity between the monomer and the latex particle will be diminished since the composition of the swelled latex particles will be more like that of the monomers.

The size of the pimples is, besides the degree of swelling, also determined by the size of the particles in the latex. At a smaller size a lower part by weight of latex is required to give a determined degree of covering of the surface of the final particles. The smallest size of the pimples is decided both by the size the pimples should have to sufficiently eliminate the attraction to the photo-drum due to van der Waal forces or due to a too strong electrostatic adhesion and by the smallest size which it is technically possible to prepare. With regard to van der Waal attraction this will decrease to a high extent already when the base particles, the main particles, are removed from each other by 10 nm. If half the size of the pimples is outside the surface of the base particle it should then suffice with a diameter of 20 nm for the particles in the used latex. The largest size of the pimples is a diameter corresponding to about 33% of the diameter of the spherical main particle. The mean diameter of the particles in the latex should be from 0.05 to 33% of the mean diameter of the main particle, and this should be within the range of from 2 to 25 $\mu$m.

The chemical composition of the latex particles forming the pimples can be selected arbitrarily as long as the particles are not dissolved in the monomer or monomer mixture used for formation of the main particle. As has been stated, the hydrophilic-hydrophobic balance must, however, be considered. Further, the fact that the pimples influence the triboelectric properties of the final particle must also be considered. The pimples represent the outer contour of the toner particles. At rubbing, the type and level of the triboelectric charge is thus determined by the chemical composition of the pimples. Further it should be considered that the electrostatic charge will be greater with protuberances in the form of pimples due to the increased surface of the powder particles. The pimples may also influence the speed in charging/decharging of the particles because their small radius of curvature compared to the radius of the base particle.

The degree of covering, is an important factor and we have found that already a covering of from 1 up to 10% has a positive effect.

The property of the pimply spherical particles to give a decreased adhesion to surfaces and between the particles themselves can give advantages also in other fields than electrophotographic copying. It has thus been found that they give a reduced adhesion to the screen if they are used for electrostatic printing according to the "dry silk-screen" method. Such prints will thus have a stronger colouring than if spherical particles with smooth surface are used.

The rough surface results, as has been mentioned, in a reduced mutual attraction between the particles. A powder of such particles will thus have better free-flowing properties. Owing to the low tendency to formation of powder aggregates particles with a rough surface are advantageously used also in powder coating operations, for example for coating of metal articles when the powder is sintered on.

Choice of material will be discussed more in detail below and when nothing else is stated this is valid independent of the method of preparation of the base or main particles coated with fine-grained polymerizate.

As monomers, alone or in mixture, for the preparation of the latex particles the following can for example be used: styrene and different derivatives of styrene, acrylic acid and methacrylic acid or esters thereof, acrylo nitrile, vinyl chloride, vinyl fluoride, vinylidene fluoride, vinyl acetate etc. To obtain cross-linking polyfunctional monomers can be used, eg divinyl benzene, ethylene glycol diacrylate, ethyleneglycol dimethacrylate, trimethylolpropane triacrylate etc. The amount of cross-linker can be varied to a high degree as long as the latex particles fulfil the requirements on correct hydrophilicity and insolubility.

For the preparation of the base particle, or the main particle, the same monomers, and also cross-linkers, as above can be used, but generally such a mixture is used that this particle will have a lower softening point than the latex particles.

The preferred main monomers for both latex particles and base or main particles are styrene, acrylates and methacrylates.

As emulsifiers for the preparation of the latex particles conventional surfactants for emulsion and microsuspension polymerization respectively are used. However, care should be taken that the emulsifier system will not to a too high degree negatively influence the function of the colloid system which is used for the preparation of the base particle or the main particle. It is also advantageous if the used emulsifiers have such a water solubility that they can be washed away from the surface of the produced pimply toner particles.

As initiator at the production of the latex particles according to emulsion polymerization technique conventional water soluble initiators can be used, eg persulphates, hydrogen peroxide, hydroperoxides, etc. For latex according to the microsuspension polymerization technique conventional monomer soluble initiators can be used, eg dialkyl peroxidicarbonates, tert.butyl peroxipivalate, octanoyl peroxide, lauroyl peroxide, tert.butyl peroxy(2ethylhexanoate), benzoyl peroxide, 2,2-azobisisobutyronitrile, 2,2-azobis-2,4-dimethylvaleronitrile and similar compounds. For the preparation of the base or main particles the same initiators as those for preparation of latex according to microsuspension polymerization can be used.

As protective colloid in the colloid system for the preparation of base or main particles, water soluble colloids of the type cellulose derivatives, polyvinyl alcohol etc or powder stabilisers of the type difficultly soluble phosphates, metalhydroxides, silica etc can be used. The powder stabilisers are preferably used together with a suitable co-stabiliser.

As colorants to be mixed with the monomer for the base or main particles inorganic colorants, organic colorants, magnetite or carbon black are used. In certain cases it is suitable to give the pigments a surface treatment so that they will remain finely divided in the monomer drops. Toner particles according to the invention will thus be colored throughout, ie the colorant is present included, and more or less uniformly distributed in the polymerice base or main particle. As has been stated it is also possible to let colorant and certain other additives be present in latex prepared according to microsuspension polymerization processes.

The toner particles of the invention can be used together with conventional carriers for developer composition in known manner. The invention is further illustrated in the following examples which, however, are not intended to limit the same. Parts and percent relate to parts by weight and percent by weight, unless otherwise stated.

Example 1–11 relate to the first described method with its different variations, where fine-grained particles are adhered to the surface of base particles.

Example 12–16 relate to the second described method with fine-grained particles present at the preparation of the base particle.

EXAMPLE 1

Preparation of a fine-grained polymerizate. Emulsion polymerization.

40 g of styrene, 1.8 g of sodium dodecylsulphate and water to totally 395 g were charged to a 500 ml glass flask equipped with cooling means, agitator and a valve for evacuation and introduction of nitrogen. The mixture was heated to 80° C. under agitation. At 80° C. 5 g, 3.5% of hydrogen peroxide was added and the same time the mixture was subjected to a nitrogen atmosphere.

The polymerization was then allowed to continue for 12 hours which gave a 0.11 $\mu$m 10% seed latex.

120 g of the above seed latex, 200 g of 5 g/kg sodium dodecylsulphate, 0.4 g of divinyl benzene, about 50%, 27.6 g of styrene and water to totally 395 g were charged to the same equipment as above and the same procedure was then followed. In this manner a cross-linked polystyrene latex was prepared with particles of 0.16 $\mu$m and a dry content of 10%.

EXAMPLE 2

Preparation of a fine-grained polymerizate. Microsuspenion polymerization.

250 g of styrene, 0.8 g of neozapon schwartz X 51 charge modifier (from BASF) and 2.5 g of 2,2'-azobis (2,4-dimethylvaleronitrile) were charged to the same equipment as in Example 1. The monomer mixture was heated and the bulk polymerization allowed to continue for two hours at 85° C. which resulted in a viscosity increase at 24° C. from 10.5 to 13 seconds (Ford-cup, 4 mm nozzle).

198 g of bulk polymerizate, 2 g of divinyl benzene, about 50%, 7 g of 2,2'azobis(2,4-dimethylvaleronitrile)

were emulsified with 828 g of 3 g/kg sodium dodecylsulphate in an Ultra Turrax for some minute.

The pre-emulsion was charged to a 2-step Manton Gaulin homogenizer, model 15 M, where a narrow drop size distribution of 0,19 μm (determined with a Coulter Nanosizer) was obtained. The homogenized emulsion and 1 g of sodiumdodecylsulphate were charged to a 1,5 l glass autoclave which was placed under nitrogen gas atmosphere. The emulsion was polymerized at 65° C. during 12 hours. In this way a 0,19 μm, 19% microsuspension with charge modifier incorporated during polymerization and cross-linked with 0,5% divinyl benzene was obtained.

EXAMPLE 3

Preparation of base particle.

To a solution of 2 kg 0.16 molal trisodium phosphate 520 g of 1.0 molal calcium chloride solution was added under agitation and finally 150 g of a 0.2% solution of sodium dodecylbenzenesulphonate. The now obtained mixture was diluted to 2965 g with 0.2% potassium dichromate solution and forms the dispersion medium.

700 g of styrene, 300 g of buthyl methacrylate, 80 g of carbon black "Printex V" (Degussa) and 3 g of neozapon schwartz X 51 (BASF) were dispersed in a ball mill to give a carbon-monomer dispersion.

10 g of 2,2-azobis(2,4-dimethylvaleronitrile) was dissolved in 990 g of carbon-monomer dispersion and added together with the dispersion medium (2965 g) to a reactor. The mixture was put under nitrogen gas atmosphere and allowed to polymerize at a rapid heating from room temperature and further at 85° C. for 1 hour under moderate agitation. The mixture was cooled to room temperature and pH adjusted to about 3 whereby 35 g of 2,2-azobis(2,4-dimethylvaleronitrile) was added. After agitation for a couple of minutes pH was adjusted to about 9 and the mixture was recirculated through a dispersion unit "Ystral" (Bergius Trading AB) and emulsified to a suitable drop size for toner particles. The reactor was once again placed under nitrogen gas atmosphere and polymerization continued for 18 hours at 65° C. under moderate agitation. The suspension was then cooled to room temperature.

A part of the polymerizate was transferred to a vessel and pH adjusted to 2 with HCl and calcium phosphate which functions as protective colloid was hereby dissolved. The suspension was filtered and first washed with acidified water and then with distilled water to finally be dried at 35° C.

In this manner toner particles with a particle size of about 10 μm and with a charge of −12 uC/g against a Höganäs carrier were obtained. Copying tests with the toner in a Mita DC 313 Z first gave good copying results but the reproducability was fairly rapidly impaired due to the strong adhesion of the spherical, smooth toner particles to the photo-drum.

EXAMPLE 4

Coating of base particles with fine-grained particles.
70 g of 10% polystyrene latex prepared according to Example 1, 390 g of 1.5 g/kg sodium dodecylsulphate and 2 l of water was mixed and form the coating dispersion.

2 kg 1.5 g/kg sodium dodecylsulphate were charged to a reactor containing 4 kg of a suspenion prepared according to Example 3 and pH was then adjusted to 2 with HCl. The coating dispersion was then added for 20 minutes under good agitation and then mixed for totally 1 hour before the temperature was raised to 65° C. At 65° C. pH was adjusted with NH₃ to 8.3 and the temperature further raised to 90° C. After less than 5 minutes at 90° C. the now coated toner suspension was cooled to room temperature.

Subsequently pH was adjusted to 2 using HCL and calcium phosphate, which functions as protective colloid, was hereby dissolved. The suspension was filtered and first washed with acidified water and then with distilled water. A sample was doped with 0.05% neozapan schwartz X 51, based on the amount of polymer, by slurrying the filtercake in water after the washing and mixing with a 1% methanol solution of the charge modifier and filtration was then carried out again.

Investigation with a scanning electron microscope showed that the polystyrene particles had been adsorbed by the base particles and, due to the heat treatment, been melted into the base particles to about half their volume. The amount of polystyrene latex used was so that about 10% of the surface of the base particles was covered by fine-grained particles. In this manner toner particles with a "pimply" surface were obtained and they gave a charge of −14 uC/g against a Höganäs carrier. Copying tests with a Mita DC 313Z did from the beginning give very good copies and the reproducability was still good after 30000 copies. A particularly good background and clean copies were noted. The photo-drum was only covered by small amounts of toner which could be removed easily.

EXAMPLE 5

Coating of base particles with fine-grained particles.
Base particles were prepared in the same manner as in Example 3 and coated in the same manner as in Example 4 but with 40 g of 19% polystyrene latex prepared in accordance with Example 2.

Microscopy showed that the particles had been adsorbed and melted into the base particles to about half their volume and the degree of surface coating was also here in the order of 10%. In this manner pimply toner particles were obtained where the "pimples" contained a charge modifier which gave a charge of −17 uC/g. As the toner of Example 4 this toner also had excellent copying properties.

EXAMPLE 6

The process of Example 4 was repeated with the difference that the amount of latex was lowered to 35 g.
Microscopy showed a lower degree of covering, about 5%. Despite this toner particles obtained better copying properties than toner particles according to Example 3.

EXAMPLE 7

The process of Example 4 was repeated with the differens that the amount of latex was lowered to 7 g. This covering corresponds about 1% of the surface but despite the low covering a positive effect compared to example 3 was noted.

EXAMPLE 8

Preparation of base particle suspension.
The process of example 3 was repeated with the difference that in connection with the addition of 35 g of 2,2-azobis-(2,4dimethylvaleronitrile) at pH 3, 8 g of dimethylaminoethylmetacrylate were also added. In this way a suspension of base particles was prepared with a Zeta-potential changing from positive to negative with increasing pH at a higher pH value than for the suspension in Example 3.

EXAMPLE 9

Preparation of a base particle suspension.

The process of Example 3 was repeated with the difference that after emulsifying to suitable drop size for toner particles 11 g of trimethylaminoethylmethacrylate bromide were added. In this way a suspension of base particles was prepared, with a Zeta-potential changing from positive to negative at a higher pH than for the suspensions of Example 3 and 8.

EXAMPLE 10

Preparation of a fine-grained polymerizate.

1 g of 2-sulfoethylmethacrylate was added to an autoclave together with 309 g of water and pH was adjusted to about 4 with $NH_3$, and 0,4 g of 1 mM $CuSO_4$ solution and 80 g of styrene were added. The mixture was heated to 80° C. At 80° C. 10 g of 3,5% $H_2O_2$ was added at the same time as the mixture was put under nitrogen gas atmosphere. The polymerization was then allowed to continue for 12 hours, which resulted in a 0,14 μm, 20% latex which was free from surfactants.

40,6 g of the above prepared latex, 200 g of water and 0,4 g of 1 mM $CuSO_4$ solution were added to an autoclave equipped with two dropping funnels. To one dropping funnel 72 g of styrene was added and to the other dropping funnel 76 g of water and 1 g of 2-sulfoethylmethacrylate, for which pH was adjusted to about 4 ($NH_3$), were added. The autoclave was heated to 80° C. At 80° C. 10 g of 3,5% $H_2O_2$ was added at the same time as the whole system was put under nitrogen gas atmosphere. The content of both the dropping funnels were added during about 3 hours. The polymerization was then allowed to continue for 12 hours. In this manner a surfactant free coating latex was prepared with particles of 0,26 μm and a dry content of 20%.

EXAMPLE 11

Coating of base particles with latex.

26 g of 20% coating latex prepared according to Example 10, 90 g of 5 g/kg sodiumdodecylsulphate and 1260 g of water were mixed and constitute the coating dispersion. This amount of coating dispersion corresponds about 5% surface covering of the base particles.

To an autoclave containing 4 kg suspension of base particles, prepared according to Example 8, 480 g of 5 g/kg sodiumsulphate and 3520 g water were added. The coating dispersion was added during 20 minutes at good agitation, without preceding adjustment of pH and thus the protective colloid was not dissolved. The mixture was allowed to stand under agitation for an hour before the temperature was raised to 90° C. After a minute or so at 90° C. the coated toner suspension was cooled to room temperature. The suspension was acidified to pH 2 and filtrated and washed with water. The sample was doped in the same manner as in Example 4 and in this way pimply toner particles with good copying qualities were obtained.

The example illustrates coating of base particles with latex, when the protective colloid was present. Thus it was possible to bring together latex- and base particles and heat the mixture to obtain adhesion between base- and latex particles, in spite of the presence of protective colloid consisting of precipitated calcium phosphate.

In another test the method according to this test was repeated, with the difference that the base particles were prepared according to Example 9. The test showed that the same result was obtained irrespective of the base particles being prepared according to Example 8 or 9. When both the tests were repeated with the difference that the latex was prepared according to Example 1, the latex agglomerated in the water phase when the temperature was raised and thus no markedly pimply toner particles were obtained. The same thing happened when the test was repeated with base particles prepared according to Example 3 and latex prepared according to Example 1. Also when the test was repeated with base particles prepared according to Example 3 and latex prepared according to Example 10, no ramaining coating was obtained after the drying. Thus it was possible to coat base particles with latex also in the presence of active protective colloid, when as well base particles as latex particles were copolymerized with small amounts of functional monomeres but of opposite charge character.

EXAMPLE 12

Preparation of anionic latex.

110 g of styrene, 0.33 g of sodiumdodecyl sulphate and water to a total of 1067 g were charged to a 1.5 l glass reactor with a double jacketing and equipped with agitator and valve for evacuation and introduction of nitrogen gas. The mixture was heated to 80° C. under rapid agitation. At 80° C. 33 g of a 1% potassium persulphate solution was added and at the same time the mixture was subjected to nitrogen gas atmosphere. The polymerization was allowed to continue for 12 hours and resulted in a 0.28 μm 8% seed latex.

300 g of the above seed latex. 0.30 g of sodium dodecylsulphate and water to a total of 1060 g were charged to the same equipment as above, but in this case a dropping funnel was also connected. 100 g monomer was charged to the funnel. Depending on the desired composition of the final latex varying amounts of methacrylic acid, divinyl benzene (about 50%) and styrene were charged. In this example 1.8 g of methacrylic acid, 24 g of about 50% divinyl benzene and 74.2 g of styrene were charged and this is presumed to give a polystyrene latex cross-linked with 9.7% divinyl benzene (100%) and which also contains 1.5% methacrylic acid.

The mixture in the glass reactor was heated to 80° C. under moderate agitation. At 80° C. 40 g of a 1% potassium persulphate solution was added and at the same time the mixtures in the reactor and in the funnel were subjected to nitrogen gas atmosphere. The monomer mixture was then allowed to drop drown into the reactor for about 3 hours. The polymerization was then allowed to continue for 12 hours which gave an 0.48 μm 9% latex which is presumed to have the above stated composition.

EXAMPLE 13

Preparation of toner particles with pimply surface.

To a solution of 2 kg of 0,16 molal trisodium phosphate 520 g of 1.0 molal calcium chloride solution was added under agitation and finally 150 g of 0.2% sodium dodecylbenzene sulfonate was added. The now obtained mixture was diluted to 2965 g with 0.2% potassium dichromate solution and forms the dispersion medium.

700 g of styrene, 300 g of butyl methacrylate, 80 g of carbon black "Printex v" (Degussa), 3 g of charge modifier "Neozapon Schwartz X51" (BASF) and 3.5 g of azobisisobutyronitrile and 50 g of polyethylene wax, as release agent, were dispersed under controlled temperature in a ball mill. During the process the temperature was allowed to slowly reach 105° C. 1 kg of fairly warm carbon-monomer dispersion was charged to an autoclave containing 100 g of 9% latex prepared according to Example 12 and water to a total of 1 kg. During slow agitation HCl was added until the latex had been absorbed by the monomer phase. This was established by simple microscope investigation. The mixture was then made alkaline (pH about 9) by $NH_3$ and 35 g of 2,2azo-bis(2,4-dimethylvaleronitrile) were added. After agitation for a couple of minutes the dispersing medium (2965 g as above) was added. The agitation in the reactor was intensified so that satisfactory agitation was obtained and the mixture was recirculated through a dispersing unit "Ystral" (Bergius Trading AB) and was hereby emulsified to a suitable size for toner particles. The reactor was put under nitrogen gas atmosphere and polymerization was allowed to continue for 18 hours at 65° C. under moderate agitation. The suspension was then cooled to room temperature, pH was adjusted to 2 with HCl and calcium phosphate, which functions as protective colloid, was hereby dissolved. The suspension was filtered and washed first with acidified water and then with clean water and finally dried at 35° C. Investigation with scanning electron microscope showed that the cross-linked polystyrene latex particles with 1.5% methacrylic acid had been oriented towards the phase boundary surface of the toner particles so that about half the volume of the latex particles protruded out from the surface.

Copying tests in a Mita DC 313Z with a Höganäs carrier gave excellent copying properties and the reproducability was still good after 30000 copies.

EXAMPLE 14

This example shows how the position of the latex particles in the phase boundary surface of the toner particles can be controlled at the production of pimply particles.

Four latexes with varying contents of methacrylic acid, 0.5%, 1%, 2% and 2.6%, and a constant amount of divinyl benzene 9.7% were prepared according to Example 12.

In the same manner as in Example 13, 0,5% of the above described latexes (calculated as dry latex) were in turn added to 1 kg of the warm carbon-monomer dispersion which was then emulsified and polymerized in accordance with the procedure described in Example 13. In this manner four different types of toner with varying roughness were obtained. Investigations with scanning electron microscope showed that:

(1) Toner particles in the case wherein latex with 0.5% methacrylic acid had been absorbed had an almost smooth surface.

(2) Toner particles with 1% methacrylic acid latex had an uneven surface but only a minor part of the diameter of the latex particles protruded above the phase boundary surface of the toner particles.

(3) Toner particles with latex containing 2% methacrylic acid had an uneven surface and the latex particles were well visible above the phase boundary surface. It was estimated that a little more than half the diameter protruded out from the phase boundary surface.

(4) Toner particles with latex containing 2.6% methacrylic acid also had well visible latex particles in the surface but the latex was found to be even more protrusive than before.

In all cases the unevennesses were fairly uniformly distributed over the surface of the toner particles. Copying tests in a Mita DC 313Z with Höganäs carrier gave excellent copying results above all with toner types with latex containing a higher part of methacrylic acid.

EXAMPLE 15

Preparation of amphoteric latex.

To the same equipment as in Example 12 1.5 g of "Querton 16Cl29" (KenoGard), 1.5 g of 1 mM $CuSO_4$ and water to a total of 1032 g were added. To the connected funnel 150 g of styrene charged. The mixture in the glass reactor was heated to 80° C. under moderate agitation. At 80° C. 18 g of 3.5% $H_2O_2$ added and at the same time the mixtures in the reactor and the dropping funnel were placed under nitrogen gas atmosphere. The monomer was added to the reactor during about half an hour. After additionally 2 hours 1.5 g of Querton 16Cl29 charged and the reactor again placed under nitrogen gas atmosphere. The polymerization was then allowed to continue for 10 hours which resulted in a 0.13 μm 11% seed latex.

150 g of a seed latex, 3.3 g of Querton 16Cl29, 1.5 g of 1 mM $CuSO_4$ and water to a total of 1082 g were charged to the same equipment as above. To the dropping funnel 103.5 g of monomer charged. Depending on the desired composition of the final latex varying amounts of (2-dimethylaminoethyl)-methylacrylate (DMAEMA), methacrylic acid, divinyl benzene (about 50%) and styrene were charged.

In this Example 4.71 g of DMAEMA, 0.51 g methacrylic acid, 12 g of about 50% divinyl benzene and 86.28 g of styrene were charged and presumed to give a polystyrene latex, cross-linked with 5% divinyl benzene (100%) and which also contains 3.9% DMAEMA and 0.4% methacrylic acid.

The pH of the mixture in the reactor was adjusted to 2 with HCl and heated to 80° C. under moderate agitation. At 80° C. 15 g of 3.5% $H_2O_2$ added and the mixtures in the reactor and the funnel were at the same time subjected to nitrogen gas atmosphere. The monomer mixture was then allowed to drop down into the reactor for about 3 hours. The polymerization was then allowed to continue for 12 hours and this resulted in a 0.2 μm 9% latex which is presumed to have the above stated composition.

EXAMPLE 16

Preparation of toner particles with "pimply" surface using amphoteric latex.

In the same manner as in Example 13 0,3% of amphoteric latex (calculated as dry) prepared according to example 15 were absorbed in the warm monomer-carbon dispersion, but the absorption took place in alkaline environment with $NH_3$/NaOH. After the absorption pH was adjusted to about 9 and the mixture emulsified and polymerized in accordance with Example 16.

Investigation with a scanning electron microscope showed that the latex particles of 0.2 μm had been oriented towards the surface.

In the same manner as in Example 15 additionally two latexes were prepared which had the same dry contents calculated in moles of amine and carboxylic acid groups but the ratio was changed from 5:1 to 1:1 and 1:5 respectively of amine and carboxylic acid. In the same manner as above two additional types of toner particles were prepared using these new latexes.

Investigation in microscope showed that also for the two later types the 0.2 µm latex particles had been oriented towards the surface. In these cases the basic shape of the toner particles was still smooth but part of the diameter of the latex particles protruded out from the phase boundary surface.

In this manner particles suitable for copying of electrostatic printing were prepared.

Example 17-19 relate to the application of fine-grained particles according to a dry method.

EXAMPLE 17

Preparation of a fine-grained polymerizate.

The process of Example 2 was repeated with the difference that divinyl benzene and sodium dodecylsulphate were excluded. The organic phase was instead emulsiefied with 828 g of 3 g/kg ammonium laurate. In this way a 0,2 µm microsuspension containing charge modifier was obtained.

EXAMPLE 18

Coating of base particles with fine-grained particles in a dry process.

4 kg of suspension of base particles, prepared according to Example 3, were acidified, filtered and washed with water. The filter cake was finally dried at 35° C. The microsuspension, prepared according to Example 17, was precipitated by adding acid and airdried in thin layers spread on glass sheets at 30° C. 1 kg of dry base particles and 4 g of dry fine-grained particles, obtained from the dried microsuspension, were charged together with polyethylen granules, about 4 mm in size, to a powder mixer and mixed for 1 hour. The temerature of the powder bed was then raised during continued agitation to 55° C. and held there for 30 minutes in order to adhere the fine-grained particles to the base particles. Finally the temperature was raised for a short period to about 70° C. in order to partly melt the fine particles into the surface of the base particles, where upon the powder bed was cooled to room temperature. The coated base particles was then separated from the granules by sieving.

In some cases the toner particles were mixed with aerosil R972 to support good powder and triboelectrical properties.

In this way toner particles with good copying properties were obtained.

EXAMPLE 19

Coating of base particles with fine-grained particles.

4 kg of suspension of base particles, prepared according to Example 3 were acidified, filtered and washed with water. The filter cake was finally dried at 35° C. 1 kg of dry base particles was charged together with polyethylen granules about 4 mm in size to a powder mixer. Vacuum was applied to the mixer and the jacket temperature was adjusted to 30° C. The microsuspension from Example 17 was added on portions of 2 ml. About 5 ml/min. were added and the addition of dispersion was stopped after 20 ml, which was equal to 4 g of dry fine-grained particles. The mixer was operated until the mixture became dry, whereupon the vacuum pumping was interrupted and the temperature was increased during continued agitation to 55° C. and after that to 70° C. in the same manner as in Example 18.

The particles were then prepared in the same manner as in Example 18.

In this way toner particles with good copying characteristics were obtained.

We claim:

1. Toner for electrophotographic copying or electrostatic printing, characterized in that it comprises an internally pigmented thermoplastic base or main particle prepared by suspension polymerization and having a mean diameter within the range of from 2 to 25 µm, the surface of the base particle being covered by a fine-grained polymerizate prepared by emulsion- or microsuspension polymerization and having a mean diameter of from 0.05 to 33 percent of the mean diameter of the base particle and whereby from 1 up to 10 percent of the surface of the base particle is covered by the fine-grained polymerizate.

2. Toner according to claim 1, characterized in that the mean diameter of the fine-grained polymerizate is from 0.2 to 15 percent of the mean diameter of the base particle.

3. Toner according to claim 1, characterized in that also the fine-grained polymerizate is internally pigmented.

4. Toner according to claim 1, characterized in that the melting point of the fine-grained particles is >10° C. higher than that of the base particles.

5. Toner according to claim 1, characterized in that the fine-grained particles have been prepared by microsuspension polymerization and contain a charge modifying agent.

6. A method for the preparation of a toner for electrophotographic copying or electrostatic printing according to claim 1, characterized in that an aqueous dispersion of an internally pigmented thermoplastic base particle prepared by suspension polymerization and having a mean diameter within the range of from 2 to 25 µm is brought into contact with a latex of a fine-grained polymerizate having a mean diameter of from 0.05 to 33 percent of the mean diameter of the base particle whereafter the temperature is raised so that the fine-grained particles adhere to the surface of the base particles to a degree of covering of from 1 up to 10%.

7. A method according to claim 6, characterized in that the aqueous dispersion of the pigmented base particle contains polymerization serum from the polymerization of the base particle, which serum contains a protective colloid system.

8. A method according to claim 6, characterized in that an aqueous dispersion of the pigmented base particle is brought into contact with a latex of the fine-grained polymerizate whereafter a protective colloid system is formed in the aqueous dispersion and the temperature is raised so that the fine-grained particles adhere to the surface of the base particles.

9. A method according to claim 7, characterized in that the protective colloid system is deactivated before the adding of the latex of the fine-grained polymerizate, whereafter the protective colloid system is reformed and the temperature is raised.

10. A method according to claim 7, characterized in that latex of the fine-grained polymerizate having functional groups of opposite charge than the base particles is added whereby the latex particles are attracted to the base particles and thereby penetrating the colloid layer.

11. A method for the preparation of a toner for electrophotographic copying or electrostatic printing according to claim 1, characterized in that an internally pigmented termoplastic base particle having a mean diameter within the range of from 2 to 25 μm is prepared by suspension polymerization of a monomer or a monomer mixture in the presence of a latex of a fine-grained polymerizate having a mean diameter of from 0,05 to 33 percent of the mean diameter of the base particle, the particles of the latex being substantial insoluble in the monomer and said latex particles having a higher degree of hydrophilicity than the polymer material in the main particles formed at the suspension polymerization.

12. A method according to claim 11, characterized in that the latex polymer material originates from a monomer mixture which for control of hydrophilicity contains a monomer with anionic character in alkaline environment.

13. A method according to claim 11, characterized in that the latex polymer material originates from a monomer mixture which for control of hydrophilicity contains a monomer with cationic character in acid environment.

14. A method according to claim 11, characterized in that the latex polymer material originates from a monomer mixture which for control of hydrophilicity contains a monomer with an amino group.

15. A method according to claim 11, characterized in that the latex polymer material originates from a monomer mixture which for control of hydrophilicity contains a monomer with hydroxyl group.

16. A method according to claim 11, characterized in that the latex particles are cross-linked.

17. A method for the preparation of a toner for electrophotographic copying or electrostatic printing according to claim 1, characterized in that a dry internally pigmented thermoplastic base particle prepared by suspension polymerization and having a mean diameter within the range of from 2 to 25 μm, is mixed with fine-grained plastic particles having a mean diameter of from 0.05 to 33 percent of the mean diameter of the base particles in an amount sufficient to cover from 1 up to 10% percent of the surface of the base particle, whereafter the temperature is raised so that the fine-grained particles adhere to the surface, whereby the fine-grained particles have a higher melting point than the base particles.

* * * * *

UNITED STATES PATENT AND TRADEMARK OFFICE
CERTIFICATE OF CORRECTION

PATENT NO. : 4,923,776
DATED : May 8, 1990
INVENTOR(S) : BERTIL HEDVALL et al

It is certified that error appears in the above-identified patent and that said Letters Patent is hereby corrected as shown below:

ON TITLE PAGE: please correct the inventors as follows:

[75] Inventors: BERTIL HEDVALL, Sundsvall; GUNNAR MATTSON, Njurunda; STEN PORRVIK; GORAN SUNDSTROM; STURE NILSSON of Sundsvall, all of Sweden

[*] Notice: The portion of the term of this patent subsequent to Dec. 27, 2005, has been disclaimed.--; and in item [45], after "May 8, 1990" insert --*--.

Signed and Sealed this

Twenty-sixth Day of May, 1992

Attest:

DOUGLAS B. COMER

*Attesting Officer*     *Acting Commissioner of Patents and Trademarks*